United States Patent
Amick et al.

(10) Patent No.: US 9,714,530 B2
(45) Date of Patent: Jul. 25, 2017

(54) INERTIA LOCK FOR A CONSOLE ARMREST

(71) Applicant: GM GLOBAL TECHNOLOGY OPERATIONS LLC, Detroit, MI (US)

(72) Inventors: Douglas J. Amick, Troy, MI (US); John T. Goscicki, Sterling Heights, MI (US); Timothy A. Kiester, Sterling Heights, MI (US); Kenton L. West, Orion, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/854,174

(22) Filed: Sep. 15, 2015

(65) Prior Publication Data

US 2017/0074005 A1 Mar. 16, 2017

(51) Int. Cl.
*E05B 77/06* (2014.01)
*E05B 77/54* (2014.01)
*E05B 83/32* (2014.01)
*E05B 85/22* (2014.01)
*B60R 7/04* (2006.01)
(Continued)

(52) U.S. Cl.
CPC .............. *E05B 77/54* (2013.01); *B60N 2/4686* (2013.01); *B60R 7/04* (2013.01); *E05B 77/06* (2013.01); *E05B 77/12* (2013.01); *E05B 83/32* (2013.01); *E05B 85/22* (2013.01)

(58) Field of Classification Search
CPC .......... B60N 2/46; B60N 2/4686; B60R 7/04; B60R 2011/0007; B60R 2011/0014; B65D 43/16; B65D 43/22; E05B 77/06; E05B 77/12; E05B 83/28; E05B 83/32
See application file for complete search history.

(56) References Cited

U.S. PATENT DOCUMENTS 4,906,044 A * 3/1990 Wilstermann ....... B60N 2/4686
 292/252
5,603,540 A 2/1997 Shibao
(Continued)

FOREIGN PATENT DOCUMENTS

DE 4130847 A1 * 3/1993 ............. E05B 77/06
DE 19825708 A1 * 3/1999 ............. E05B 77/06
(Continued)

*Primary Examiner* — Glenn Dayoan
*Assistant Examiner* — Paul Chenevert
(74) *Attorney, Agent, or Firm* — Quinn IP Law

(57) ABSTRACT

An inertia locking mechanism for a bin having a bin lid and subjectable to an applied force resulting in an acceleration includes a housing attachable to the bin, a bracket attachable to the bin lid and having a locking feature, a locking pin, a biasing member, and a trigger. The locking pin is linearly moveable in the housing. The trigger has a triggering mass and is connected to the housing via a trigger pivot. The triggering mass is offset from the trigger pivot such that the triggering mass applies a torque to the trigger when the acceleration occurs in each of the front, rear, left, and right directions. The trigger is configured to release the locking pin when the acceleration exceeds a threshold acceleration such that the biasing member urges the locking pin into the locking feature of the bracket to lock the bin lid in a closed position.

20 Claims, 2 Drawing Sheets

(51) Int. Cl.
*B60N 2/46* (2006.01)
*E05B 77/12* (2014.01)

(56) References Cited

U.S. PATENT DOCUMENTS

| | | | | |
|---|---|---|---|---|
| 5,611,977 | A | * | 3/1997 | Takei ........................ A47C 7/54 |
| | | | | 264/275 |
| 6,802,550 | B1 | | 10/2004 | Griggs, Jr. et al. |
| 6,843,528 | B2 | * | 1/2005 | Glynn ................. B60N 2/4606 |
| | | | | 297/188.01 |
| 7,201,405 | B2 | * | 4/2007 | Le ........................... E05B 77/06 |
| | | | | 292/93 |
| 7,571,948 | B2 | | 8/2009 | Suh |
| 7,607,727 | B2 | * | 10/2009 | Park ..................... B60N 2/4686 |
| | | | | 292/131 |
| 8,191,953 | B2 | * | 6/2012 | Simon ................. B60N 2/4686 |
| | | | | 292/DIG. 22 |
| 8,398,130 | B2 | * | 3/2013 | Park .......................... B60R 7/06 |
| | | | | 292/333 |
| 9,308,843 | B2 | * | 4/2016 | Pichler-Wilhelm .... B60N 2/466 |
| 9,534,424 | B2 | * | 1/2017 | Bendel .................... E05B 77/06 |
| 9,567,777 | B1 | * | 2/2017 | Vandenbrink ........... E05B 77/06 |
| 9,574,381 | B2 | * | 2/2017 | Beck ....................... E05B 85/14 |
| 2004/0201238 | A1 | * | 10/2004 | Griggs, Jr. ........... B60N 2/4686 |
| | | | | 296/24.34 |
| 2014/0375068 | A1 | * | 12/2014 | Niegeloh .................. E05B 7/00 |
| | | | | 292/336.3 |

FOREIGN PATENT DOCUMENTS

| | | | | |
|---|---|---|---|---|
| DE | 102008020433 | A1 | * 10/2009 | ............ E05B 77/06 |
| DE | WO 2010046113 | A1 | * 4/2010 | ............ E05B 77/06 |
| DE | 102009046380 | A1 | * 5/2011 | ............ E05B 77/06 |
| DE | 102010023731 | A1 | * 12/2011 | ............ E05B 77/06 |
| DE | 102011053395 | A1 | * 3/2013 | ............... B60R 7/04 |
| FR | 2228384 | A5 | * 11/1974 | ............ E05B 77/12 |
| GB | 1324131 | A | * 7/1973 | ............ E05B 77/06 |
| JP | EP 0561332 | A1 | * 9/1993 | ............... B60R 7/06 |
| JP | 2016188515 | A | * 11/2016 | ............ E05B 77/06 |

\* cited by examiner

US 9,714,530 B2

INERTIA LOCK FOR A CONSOLE ARMREST

TECHNICAL FIELD

This disclosure relates to an inertia lock for a console armrest.

BACKGROUND

A vehicle may include a console between the front and/or rear seats. The console may include a bin for storage of various items and a bin lid or console armrest that is normally in a closed position such that it covers or closes the bin and contains the various items. The bin may be openable by pivoting the armrest on a hinge connecting the armrest to the bin such that the various items in the bin can be accessed. The vehicle may be subjectable to an acceleration. It may be beneficial to lock the armrest in the closed position in the event of the acceleration such that the armrest will not open.

SUMMARY

An inertia locking mechanism and a vehicle are provided herein. The inertia locking mechanism is for a bin having a bin lid and subjectable to an applied force resulting in an acceleration of the bin. The inertia locking mechanism includes a housing, a bracket, a locking pin, a biasing member, and a trigger. The housing is attachable to the bin. The bracket is attachable to the bin lid and is configured with a locking feature. The locking pin is configured with a release feature, is connected to the housing, and is linearly moveable. The biasing member is configured to apply a biasing force to the locking pin to urge the locking pin toward the locking feature of the bracket. The trigger has a triggering mass and a trigger feature and is connected to the housing via a trigger pivot that pivots on a trigger pivot axis that is normal to the ground. The triggering mass is offset from the trigger pivot axis such that the triggering mass applies a torque to the trigger when the acceleration occurs in any one of a front, a rear, a left, and a right direction. The trigger feature is configured to disengage from the locking pin release feature when the acceleration exceeds a threshold acceleration such that the biasing force urges the locking pin into the locking feature of the bracket to lock the bin lid in the closed position.

The vehicle is subjectable to a force resulting in at least one of an acceleration in a front, a rear, a left, and a right direction relative to a direction of vehicle travel. The vehicle includes a console having a bin, an armrest, and an inertia locking mechanism. The armrest inertia locking mechanism includes a housing, a hinge arm, a locking pin, a biasing member, and a trigger. The housing is attached to the bin. The hinge arm is attached to the armrest, connected to the bin via a hinge arm pivot, and configured with a locking feature. The locking pin is configured with a release feature, connected to the housing, and linearly moveable. The biasing member is for applying a biasing force to the locking pin to urge the locking pin toward the locking feature of the hinge arm. The trigger has a triggering mass and a trigger feature and is connected to the housing via a trigger pivot that pivots on a trigger pivot axis that is normal to the ground. The triggering mass is offset from the trigger pivot axis such that the triggering mass applies a torque to the trigger when the acceleration occurs in any one of the front, rear, left, and right directions. The trigger feature disengages from the locking pin release feature when the acceleration exceeds a threshold acceleration such that the biasing force urges the locking pin into the locking feature of the hinge arm to lock the armrest in a closed position.

The inertia locking mechanism and the vehicle disclosed herein lock the bin lid or armrest in the closed position in the event of the acceleration in any one of the front, rear, left, and right directions relative to the direction of vehicle travel. This disclosure applies to any bin with a bin lid, located in any position, in any vehicle, including but not limited to a car, a truck, a bus, a train, an airplane, and a boat.

The above features and advantages and other features and advantages of the present teachings are readily apparent from the following detailed description of the best modes for carrying out the present teachings when taken in connection with the accompanying drawings.

DETAILED DESCRIPTION

Figure 1:
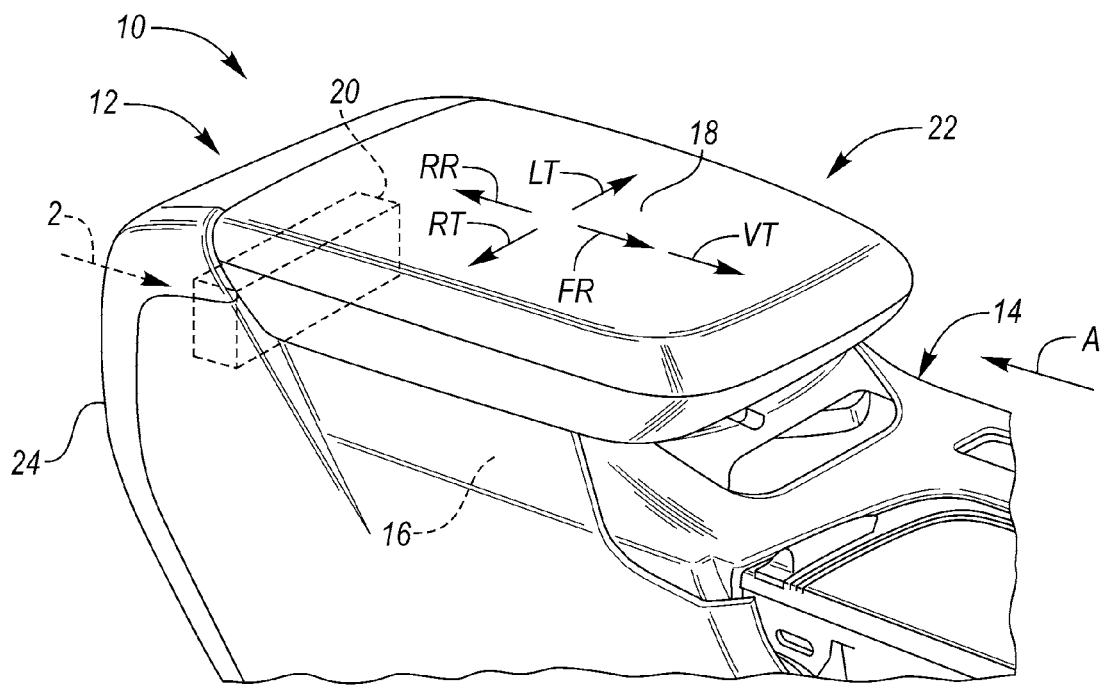
FIG. 1 is a schematic perspective illustration of a vehicle interior console armrest having a bin, an armrest, and an inertia locking mechanism.

Referring to the drawings, wherein like reference numbers refer to like components throughout the views, FIG. 1 shows a vehicle 10 having an interior 12 that includes a console 14. The console 14 may be located between the front seats (not shown), between the rear seats (not shown), or anywhere else in the vehicle 10. The console 14 includes a bin 16, a bin lid 18, and an inertia locking mechanism 20. The bin 16 is for storage of various items, such as maps, CDs, DVDs, tools, phones, papers, personal items, etc. The bin lid 18 may also be an armrest, as shown. The bin lid 18 is normally in a closed position 22, as shown, such that it covers or closes the bin 16 and contains the various items placed inside the bin 16. The bin 16 may include an end cap 24 located at the rear end of the bin 16.

The vehicle 10 is subjectable to an applied force (not shown) resulting in an acceleration (arrow A) of the bin 16 in at least one of a front direction (arrow FR), a rear direction (arrow RR), as shown, a left direction (arrow LT), and a right direction (arrow RT) relative to a direction of vehicle travel (arrow VT) and parallel to the ground. The acceleration (arrow A) may include acceleration components in two of the directions. For example, the acceleration (arrow A) may include a component in the rear direction (arrow RR) and a component in the right direction (arrow RT).

Figure 2:
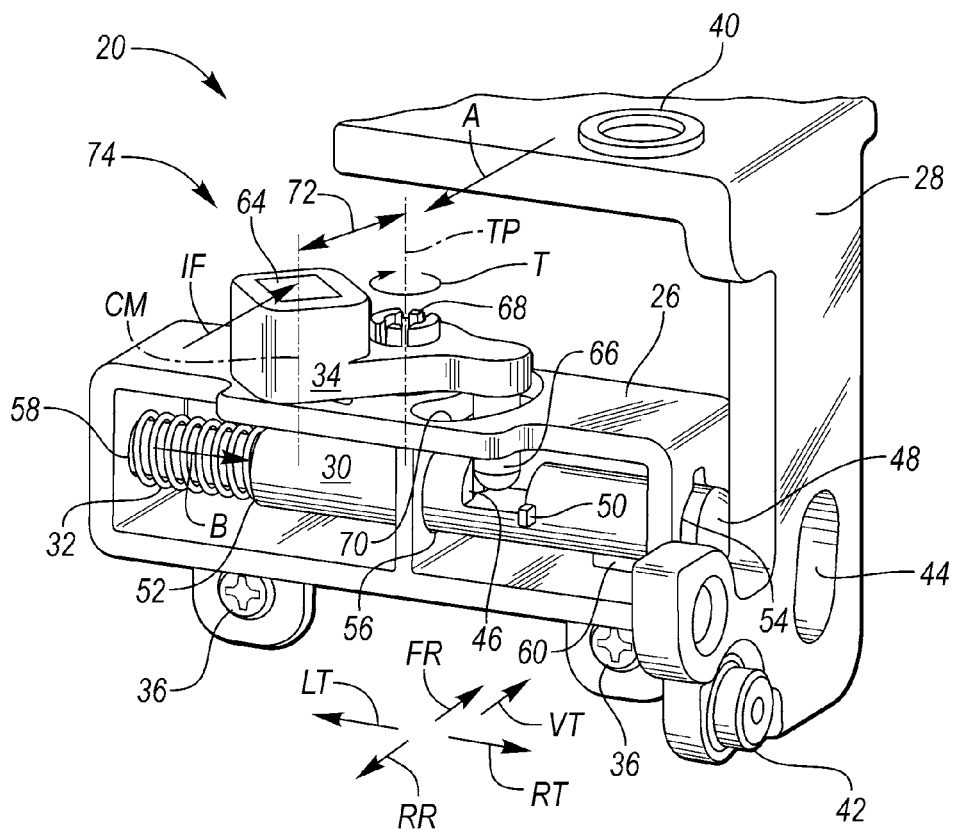
FIG. 2 is a fragmentary schematic perspective illustration of the inertial locking mechanism of FIG. 1, shown in the direction of (arrow 2) of FIG. 1, showing the inertia locking mechanism in a normal or unlocked position.

Referring now to FIG. 2, the inertia locking mechanism 20 includes a housing 26, a bracket 28, a locking pin 30, a biasing member 32, and a trigger 34. The housing 26 is attached to the bin 16 via a housing attachment 36. The housing 26 may be attached to the bin 16 in the area of the end cap 24, as shown. The housing 26 may be made of a metal, a nonmetal, or a composite material. The housing 26 may be made of an injection molded filled or unfilled plastic material. The housing attachment 36 may be a screw or bolt, as shown, or may be any other suitable attachment, including but not limited to a weld, a bond, and a rivet. The housing 26 may be any suitable configuration and may be a part of the bin 16.

The bracket 28 is configured with a bin lid attachment feature 40 and is attached to the bin lid 18 via a bin lid attachment (not shown) at the bin lid attachment feature 40. The bin lid attachment may be a screw, a bolt, a weld, a bond, a rivet, or any other suitable attachment. The bracket 28 may be a hinge arm, as shown, and may be connected to the housing 26 via a hinge arm pivot 42. The hinge arm pivot 42 may include a cylindrical pin and a bushing, as shown, a bearing, or any other suitable pivot mechanism. The bracket 28 is configured with a locking feature 44. The locking feature 44 may be a slot, as shown, a round hole, or any other suitable locking feature formed anywhere on the bracket 28. The bracket 28 may be any suitable configuration and may be a part of the bin lid 18.

The locking pin 30 may be substantially cylindrical, as shown, or may be any other suitable shape. The locking pin 30 is configured with a release feature 46, to be described in greater detail below. The locking pin 30 is connected to the housing 26 and is linearly moveable relative to the housing 26 toward the locking feature 44 in the bracket 28. The housing 26 may include one or more of a front locking pin guide feature 54, an intermediate locking pin guide feature 56, and a rear locking pin guide feature 58. The one or more locking pin guiding features 54, 56, 58 may cooperate with the locking pin 30 to guide the linear motion of the locking pin 30 relative to the housing 26.

Figure 3:
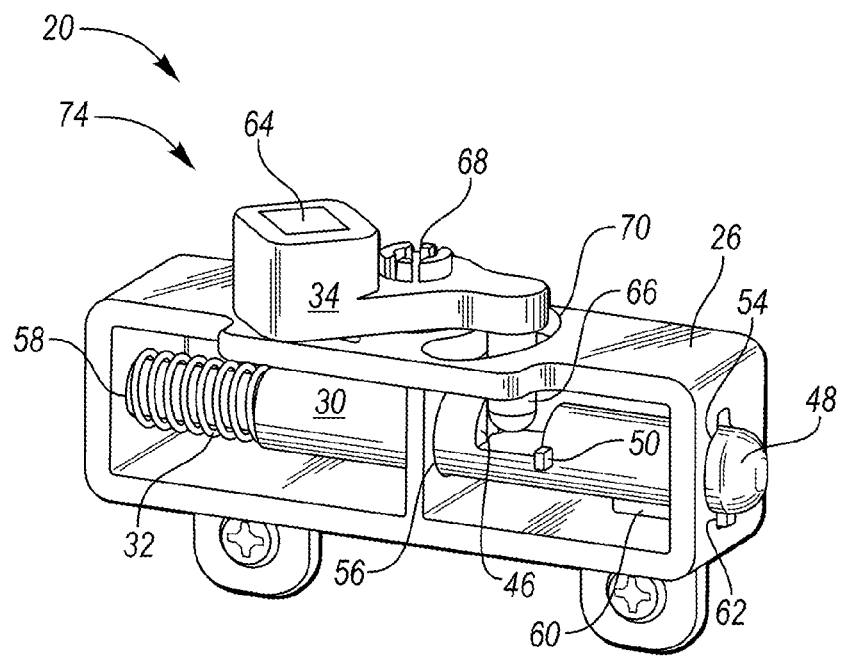
FIG. 3 is a schematic perspective view of the inertia locking mechanism of FIG. 2, with a hinge arm removed for clarity.

Referring now the FIG. 3, the locking pin 30 may be configured with a locking pin anti-rotation feature 60, and the housing 26 may be configured with a housing anti-rotation feature 62. The locking pin anti-rotation feature 60 may be configured to cooperate with the housing anti-rotation feature 62 to prevent rotation of the locking pin 30 relative to the housing 26. The locking pin anti-rotation feature 60 may be a key formed on the locking pin 30, as shown, and the housing anti-rotation feature 62 may be a slot formed in the housing 26, as shown. The housing anti-rotation feature 62 may be included in one or more of the locking pin guiding features 54, 56, 58 of the housing 26, as shown. Any other suitable anti-rotation features 60, 62 may be used. For example, the locking pin anti-rotation feature 60 may be a flat surface on the locking pin 30 configured to cooperate with a housing anti-rotation feature 62 that may be a flat surface on one or more of the locking pin guiding features 54, 56, 58 of the housing 26.

The locking pin 30 may include an engagement feature 48 to facilitate smooth engagement of the locking pin 30 with the locking feature 44 in the bracket 28. The engagement feature 48 may be a radius, as shown, a chamfer, or any other suitable engagement feature. The locking pin 30 may include a stop feature 50 configured to limit the linear movement of the locking pin 30. The stop feature 50 may be a protrusion, as shown, that cooperates with the housing 26 to limit the linear motion of the locking pin 30.

Referring again to FIG. 2, the biasing member 32 is configured to apply a biasing force (arrow B) having a biasing force magnitude to the locking pin 30 to urge the locking pin 30 toward the locking feature 44 in the bracket 28. The locking pin 30 may have a biasing member connection feature 52 for connecting the biasing member 32 to the locking pin 30. The biasing member connection feature 52 may be a land, as shown, on the locking pin 30. The biasing member 32 may also be connected to the housing 26, as shown. The biasing member 32 may be a coil spring, as shown, or may be any other suitable biasing member.

The trigger 34 has a triggering mass 64 and a trigger feature 66 and is connected to the housing 26 via a trigger pivot 68 that pivots about a trigger pivot axis (axis TP) that is normal to the ground plane. The triggering mass 64 has a triggering mass magnitude and a center of mass axis (axis CM) normal to the ground plane. The triggering mass 64 may be made of a heavy material, such as lead or any other suitable metal or non-metal material. The trigger 34 may extend through a trigger slot 70 in the housing 26, as shown. The acceleration (arrow A) causes the triggering mass 64 to apply an inertia force (arrow IF) to the trigger 34 in a direction opposite of the acceleration direction (arrow A). The center of mass axis (axis CM) of the triggering mass 64 is offset from the trigger pivot axis (axis TP) in one of the left direction (arrow LT) and the right direction (arrow RT) and in one of the front direction (arrow FR) and the rear direction (arrow RR) such that the triggering mass 64 applies a torque (arrow T) to the trigger 34 when the acceleration (arrow A) occurs in any one of the front (arrow FR), rear (arrow RR), left (arrow LT), and right (arrow RT) directions (for all occurrences except for when the acceleration occurs exactly through the direction between the trigger pivot axis (axis TP) to the center of mass axis (axis CM)). For example, the triggering mass 64 may have a triggering mass offset 72 in the left direction (arrow LT) and in the rear direction (arrow RR), as shown in FIG. 2. The torque (arrow T) may be in the direction shown or may be in the opposite direction, depending of the direction of the acceleration (arrow A) and on the directions of the triggering mass offset 72.

The trigger feature 66 remains engaged with the release feature 46 of the locking pin 30, as shown in FIG. 2, until the acceleration (arrow A) exceeds a threshold acceleration such that the locking pin 30 is in an unlocked position 74 and the bin lid 18 may be opened from the closed position 22.

Figure 4:
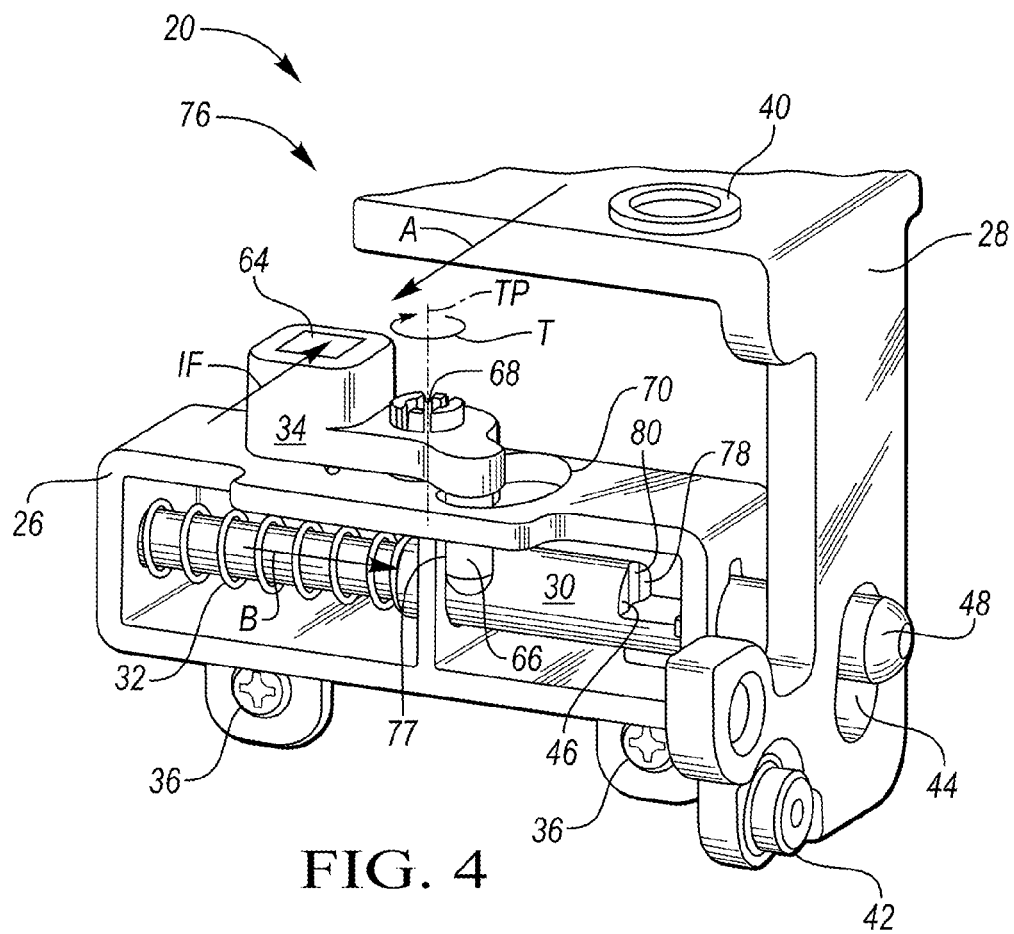
FIG. 4 is a fragmentary schematic perspective illustration of the inertial locking mechanism of FIG. 1, shown in the direction of (arrow 2) of FIG. 1, showing the inertia locking mechanism in a locked position.

Referring now to FIG. 4, when the acceleration (arrow A) exceeds the threshold acceleration, the resulting torque (arrow T) causes the trigger feature 66 to disengage from the release feature 46 of the locking pin 30 such that the biasing force (arrow B) urges the locking pin 30 into the locking feature 44 in the bracket 28 and into a locked position 76 to lock the bin lid 18 in the closed position 22, as best shown in FIG. 1. The trigger 34 may be reset, for example by pushing against the stop 50 until the trigger feature 66 is able to be placed back in the release feature 46.

Referring again to FIG. 4, the trigger feature 66 of the trigger 34 may include a trigger feature surface shape 77, such as a cylindrical surface shape, as shown, or may include any other suitable surface shape. The release feature 46 of the locking pin 30 may include a release feature surface shape 78, such as a planar surface shape, as shown, or may include any other suitable surface shape. The release feature 46 of the locking pin 30 may include a cylindrical surface shape 80, as shown. The release feature 46 of the locking pin 30 may include a detent configured to conform to the trigger feature surface shape 77 of the trigger 34, as shown.

The locking feature 44 of the bracket 28 may be a slot formed in the bracket 28, as shown, or may be any other suitable locking feature. The locking feature 44 of the bracket 28 may be configured such that the biasing member 32 urges the locking pin 30 into the locking feature 44 when the bin lid 18 has begun to open due to the acceleration (arrow A).

The threshold acceleration may be adjustable via changes in one or more of the magnitude of the triggering mass 64, the magnitude of the biasing force (arrow B), the direction of the triggering mass offset 72 from the trigger pivot axis (axis TP), the distance of the triggering mass offset 72 from the trigger pivot axis (axis TP), the trigger feature surface shape 77, and the release feature surface shape 78. The threshold acceleration level may be about 10 times gravity or may be any other suitable acceleration level.

The triggering mass 64 may be offset from the trigger pivot axis (axis TP) such that the threshold acceleration is the same for each of the front (arrow FR), rear (arrow RR), left (arrow LT), and right (arrow RT) directions. This may be accomplished by having the same offset in one of the front direction (arrow FR) and rear direction (arrow RR) and in one of the left direction (arrow LT) and the right direction (arrow RT). Alternatively, the triggering mass 64 may be offset from the trigger pivot axis (axis TP) such that the threshold acceleration is a first threshold acceleration for the front direction (arrow FR) and rear direction (arrow RR) and a second threshold acceleration for the left direction (arrow LT) and the right direction (arrow RT). This may be accomplished by having a first offset in one of the front direction (arrow FR) and rear direction (arrow RR) and a second offset in one of the left direction (arrow LT) and the right direction (arrow RT).

While the best modes for carrying out the many aspects of the present teachings have been described in detail, those familiar with the art to which these teachings relate will recognize various alternative aspects for practicing the present teachings that are within the scope of the appended claims.

The invention claimed is:

1. An inertia locking mechanism for a bin having a bin lid and subjectable to an applied force resulting in an acceleration of the bin, the inertia locking mechanism comprising:
 a housing attachable to the bin;
 a bracket attachable to the bin lid and configured with a locking feature;
 a locking pin configured with a release feature, connected to the housing, and linearly moveable;
 a biasing member configured to apply a biasing force to the locking pin to urge the locking pin toward the locking feature of the bracket; and
 a trigger having a triggering mass and a trigger feature and connected to the housing via a trigger pivot that pivots on a trigger pivot axis that is normal to the ground;
 wherein the triggering mass is offset from the trigger pivot axis such that the triggering mass applies a torque to the trigger when the acceleration occurs in each of a front, a rear, a left, and a right direction relative to a direction of vehicle travel; and
 wherein the trigger feature is configured to disengage from the locking pin release feature when the acceleration exceeds a threshold acceleration such that the biasing force urges the locking pin into the locking feature of the bracket to lock the bin lid in a closed position.

2. The inertia locking mechanism of claim 1, wherein the locking feature is a slot formed in the bracket and configured such that the biasing member urges the locking pin into the slot when the bin lid has begun to open.

3. The inertia locking mechanism of claim 1, wherein the bracket is a hinge arm that is connectable to the bin via a hinge arm pivot.

4. The inertia locking mechanism of claim 1, wherein the trigger feature includes a cylindrical surface.

5. The inertia locking mechanism of claim 1, wherein the locking pin release feature includes a planar surface.

6. The inertia locking mechanism of claim 1, wherein the locking pin release feature includes a cylindrical surface.

7. The inertia locking mechanism of claim 1, wherein the locking pin release feature includes a detent configured to conform to the trigger feature.

8. The inertia locking mechanism of claim 1, wherein the triggering mass has a triggering mass magnitude, the biasing force has a biasing force magnitude, the trigger feature includes a trigger feature surface shape, and the release feature includes a release feature surface shape; and
 wherein the threshold acceleration level is adjustable via changes in one of the triggering mass magnitude, the biasing force magnitude, the trigger feature surface shape, and the release feature surface shape.

9. The inertia locking mechanism of claim 1, wherein the triggering mass is offset from the trigger pivot axis in one of the left direction and the right direction and in one of the front direction and the rear direction.

10. The inertia locking mechanism of claim 1, wherein the triggering mass is offset from the trigger pivot axis such that the threshold acceleration is the same for each of the front, rear, left, and right directions.

11. The inertia locking mechanism of claim 1, wherein the triggering mass is offset from the trigger pivot axis such that the threshold acceleration is a first threshold acceleration for the front and rear directions and a second threshold acceleration for the left and right directions.

12. A vehicle subjectable to a force resulting in an acceleration in a front direction, a rear direction, a left direction, and a right direction relative to a direction of vehicle travel, comprising:
 a console including a bin and an armrest; and
 an armrest inertia locking mechanism including:
  a housing attached to the bin;
  a hinge arm attached to the armrest, connected to the bin via a hinge arm pivot, and configured with a locking feature;
  a locking pin configured with a release feature, connected to the housing, and linearly moveable;
  a biasing member configured to apply a biasing force to the locking pin to urge the locking pin toward the locking feature of the hinge arm; and
  a trigger having a triggering mass and a trigger feature and connected to the housing via a trigger pivot that pivots on a trigger pivot axis that is normal to the ground;
 wherein the triggering mass is offset from the trigger pivot axis such that the triggering mass applies a torque to the trigger when the acceleration occurs in each of the front, rear, left, and right directions; and
 wherein the trigger feature is configured to disengage from the locking pin release feature when the acceleration exceeds a threshold acceleration such that the biasing force urges the locking pin into the locking feature of the hinge arm to lock the armrest in a closed position.

13. The vehicle of claim 12, wherein the locking feature is a slot formed in the hinge arm and configured such that the biasing member urges the locking pin into the slot when the armrest has begun to open.

14. The vehicle of claim 12, wherein the trigger feature includes a cylindrical surface.

15. The vehicle of claim 12, wherein the locking pin release feature includes a cylindrical surface.

16. The vehicle of claim 12, wherein the locking pin release feature includes a detent configured to conform to the trigger feature.

17. The vehicle of claim 12, wherein the triggering mass has a triggering mass magnitude, the biasing force has a biasing force magnitude, the trigger feature includes a trigger feature surface shape, and the release feature includes a release feature surface shape; and wherein the threshold acceleration level is adjustable via changes in one of the triggering mass magnitude, the biasing force magnitude, the trigger feature surface shape, and the release feature surface shape.

18. The vehicle of claim 12, wherein the triggering mass is offset from the trigger pivot axis in one of the left direction and the right direction and in one of the front direction and the rear direction.

19. The vehicle of claim 12, wherein the triggering mass is offset from the trigger pivot axis such that the threshold acceleration is the same for each of the front, rear, left, and right directions.

20. The vehicle of claim 12, wherein the triggering mass is offset from the trigger pivot axis such that the threshold acceleration is a first threshold acceleration for the front and rear directions and a second threshold acceleration for the left and right directions.

\* \* \* \* \*